(12) United States Patent
Huber

(10) Patent No.: US 6,418,715 B1
(45) Date of Patent: Jul. 16, 2002

(54) HYDRAULIC ACTUATING ARRANGEMENT

(75) Inventor: Gerhard Huber, Frankenhofen (DE)

(73) Assignee: Hoerbiger Hydraulik GmbH, Schongau (DE)

( * ) Notice: Subject to any disclaimer, the term of this patent is extended or adjusted under 35 U.S.C. 154(b) by 0 days.

(21) Appl. No.: 09/711,874

(22) Filed: Nov. 14, 2000

(30) Foreign Application Priority Data

Nov. 26, 1999 (AT) ................................................ 2008/99

(51) Int. Cl.⁷ ............................ F16D 31/02; F15B 13/04
(52) U.S. Cl. ............................................. 60/476; 91/437
(58) Field of Search ......................... 60/473, 476, 494; 91/437

(56) References Cited

U.S. PATENT DOCUMENTS 4,811,562 A * 3/1989 Hoffmann et al. ............ 60/370

* cited by examiner

*Primary Examiner*—Edward K. Look
*Assistant Examiner*—Michael Leslie
(74) *Attorney, Agent, or Firm*—Dykema Gossett PLLC

(57) ABSTRACT

The two working chambers (2, 2', 3) of a working cylinder (1) of a hydraulic actuation arrangement may be directly connected with one another via a switchable dual-position valve (11), if necessary, whereby a resistance-free manual displacement of the components to be actuated is possible to a large extent—regardless of the working cylinder (1) that is driven by the hydraulic circuit (6) or also in case of a malfunctioning or a turned-off pressure medium source.

4 Claims, 1 Drawing Sheet

HYDRAULIC ACTUATING ARRANGEMENT

BACKGROUND OF THE INVENTION

1. Field of the Invention

The invention relates to a hydraulic actuating arrangement, particularly for hoods, trunk lids, doors and convertible tops of vehicles, having at least one double-action working cylinder whose working chambers are connected on one side to a switchable pressure medium source by a hydraulic circuit.

2. The Prior Art

Hydraulic actuating arrangements of the noted type are known in a great number of variations whereby desired functions are realized by the type and configuration of the hydraulic circuit. For safety reasons it is proposed in most instances that in case of turn-off or malfunction of the pressure medium source, both working chambers in the hydraulic circuit are blocked by check valves or switching elements of this type whereby the piston of the working cylinder remains locked in the particular position, and whereby a convertible top, a trunk lid or the like will not move by themselves or be displaced unintentionally.

To make emergency operation or desired manual operation possible when a pressure medium source is not available, various measures have been previously disclosed whereby a manual overpressure, relative to the limiting pressure set in a pressure relief valve, applied by the user on a door to be moved, makes possible manual closing of this door. However, in all cases there remains the disadvantage to have to use the pressure (force) necessary—even during intended manual operation—to overcome the corresponding system resistance, which is in most cases troublesome and sometimes impractical.

It is the object of the present invention to make possible, in a simple manner, emergency operation or intended manual operation of components that are normally actuated by a hydraulic actuation arrangement of the type noted above and thereby avoid the described disadvantages of such actuating arrangements.

SUMMARY OF THE INVENTION

This object is achieved with an actuating arrangement of the noted type, according to the present invention, in that both working chambers of the working cylinder can be directly connected to one another via a switchable dual-position valve. For example, this valve may be employed in relative vicinity of the particular working cylinder, parallel to the working cylinder and between the two (pressure) medium connections, which results in very short passages for the medium that is pushed from one working chamber to the other in the open position. In the closed position of the valve, other functions of the hydraulic circuit remain completely unchanged. Thereby the working cylinder is blocked in the usual manner at both sides in case of a turned-off or malfunctioning pressure medium source and the component to be displaced by the (hydraulic) actuating arrangement is held in place.

In case of a desired operation by hand of the component to be displaced, the dual-position valve may be simply switched manually or preferably by an electric switching element and, if necessary, with a lever arrangement. Thereby it is possible, for example, to open the dual-position valve with an additional lever or with the operating lever, which is combined with the trunk, during intentional manual opening of the trunk lid of an automobile without first starting the vehicle and activating the pressure medium source. After which the trunk lid may be opened practically without additional hydraulic resistance.

According to an additional embodiment of the invention, the dual-position valve is designed as a seat valve, which ensures simple and dependable operation with its simple and cost-effective component.

The invention will be described in more detail below with reference to accompanying drawings of schematically illustrated circuits of a hydraulic actuating arrangement.

DETAILED DESCRIPTION OF THE PREFERRED EMBODIMENTS

Figure 1:
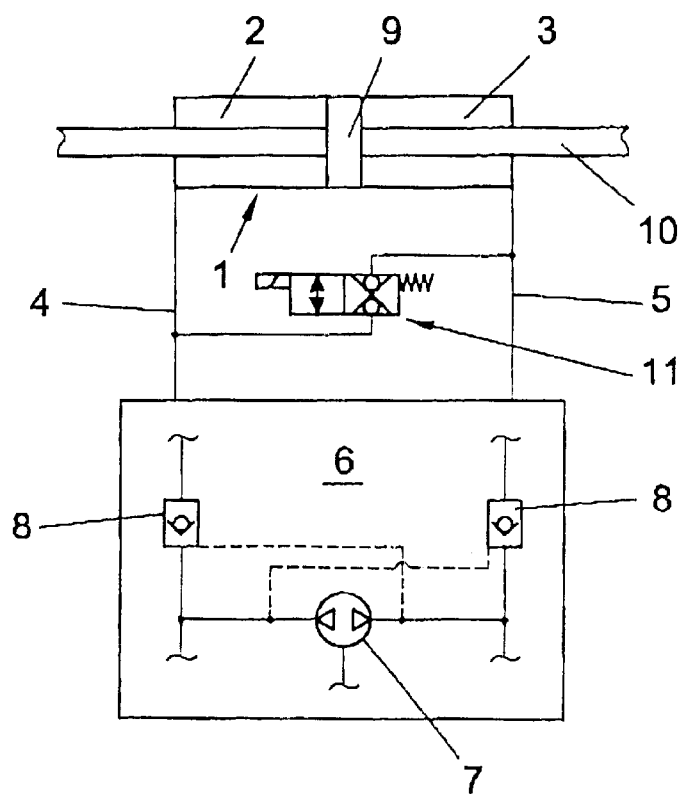
FIG. 1 shows therein an actuating arrangement according to the invention having a working cylinder which piston rods (push rods) extend from the cylinder chamber at both ends (synchronized cylinder).
Figure 2:
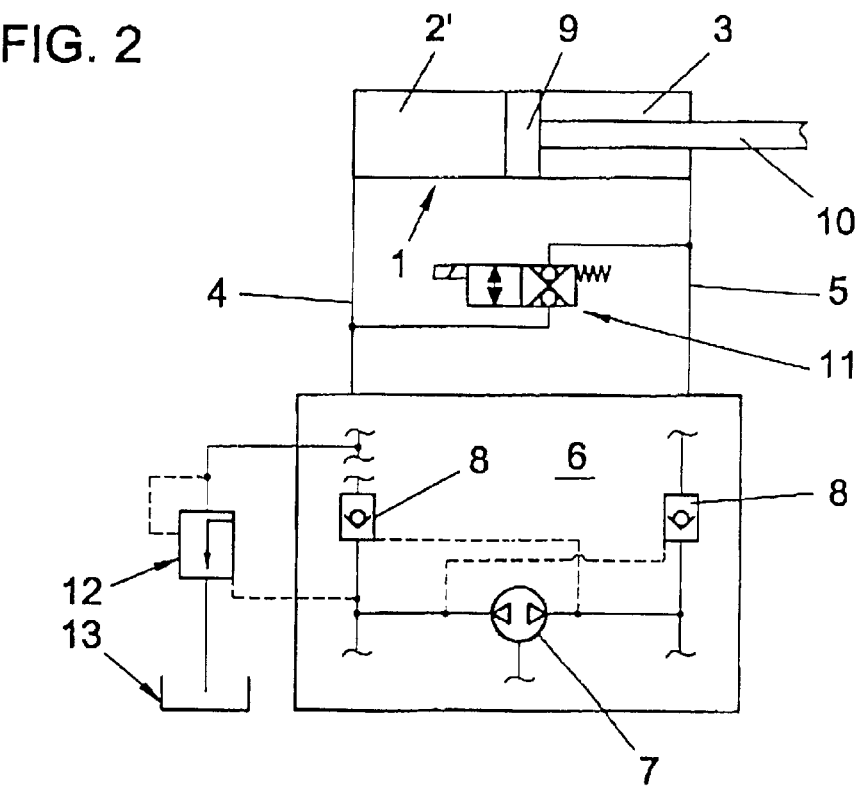
FIG. 2 shows an example of only one piston rod extending from the working cylinder.

Both hydraulic actuating arrangements of FIGS. 1 and 2 are provided with a double-action working cylinder 1 whose working chambers 2, 2' and 3 are in communication with a hydraulic circuit 6 while connected by lines 4, 5 to a pressure medium source 7 (integrated here into the hydraulic circuit 6—but it could of course be provided independently thereof). The hydraulic circuit 6 is shown here only schematically—it must be especially pointed out that in both cases only two mutual pilot-controlled (unblockable) check valves 8 are illustrated, for example, which block both working chambers 2, 2" and 3 of the working cylinder 1 should the pressure medium source 7 be turned off or malfunction and thereby hydraulically fix the piston 9 or the piston rod 10 in the particular position. Additional hydraulic circuits that allow the usual various functions have been omitted in the circuit 6 for reasons of simplicity.

To make possible an intended displacement of a non-illustrated component (for instance a convertible top, a trunk lid or the like) by means of the piston rod 10 with the pressure medium source 7 turned off or malfunctioning, and the working cylinder 1 being blocked as described, it is proposed in both illustrated cases that the two working chambers 2, 2' and 3 of the working cylinder 1 may be directly connected with one another via a switchable dual-position valve 11, which is connected parallel to the working cylinder 1 through the lines 4, 5. In the schematically illustrated case, the valve 11 is designed as a one-sided, spring-loaded, electro-magnetic actuated seat valve; however, any other corresponding switching element could be employed here. The valve 11 is normally blocked as depicted in both figures whereby no direct connection to the two working chambers 2, 2' and 3 is possible and the function of the entire arrangement is determined by the hydraulic circuit 6. In case of a desired displacement of the piston 9 in the working cylinder 1—independent from the circuit 6 or the pressure medium source 7—valve 11 is switched to the other switching position whereby forward-pushing of the (hydraulic fluid) volume between the two working chambers 2, 2' and 3 is made possible within a short passage without any losses.

In the arrangement according to FIG. 1, the volume of the working chambers 2 and 3 is equal to one another so that no other precautions have to be met to prevent the possibility of pushing the (hydraulic) volume past the valve 11. In the arrangement according to FIG. 2, the volume of the working chamber 2' that is changed by the movement of the piston 9 in the working cylinder 1 is always greater than the correspondingly changed volume of the working chamber 3 since there is no piston rod 10 on one side. An additional valve—in this case a pilot-controlled relief-valve 12—is provided hereby for compensation in or on the circuit 6, which in turn diverts excess pressure medium to the tank 13. If necessary, corresponding precautions may be provided to prevent post-suction from the tank, which is generally known and it is therefore not illustrated here.

I claim:

1. A hydraulic actuating apparatus for moving an element of a vehicle which comprises:

a double-acting working cylinder which includes a movable piston that defines first and second variable-volume working chambers therein, a pressure medium supply means, a hydraulic circuit for supplying pressure medium from said pressure medium supply means to said first and second working chambers, and a manually-switchable dual-position valve connected between said first and second working chambers, said dual-position valve enabling or blocking communication between said first and second working chambers independently of supply of pressure medium through said hydraulic circuit.

2. The hydraulic actuating apparatus according to claim 1, including a lever arrangement for manually switching said dual-position valve.

3. The hydraulic actuating apparatus according to claim 1, including an electric switching element for switching said dual-position valve.

4. The hydraulic actuating apparatus according to claim 1, wherein said dual-position valve is a seat valve.

* * * * *